Feb. 26, 1946.                A. S. BRUNJES ET AL                2,395,777
                        HALOGENATION OF AROMATIC HYDROCARBONS
                                  Filed June 22, 1942
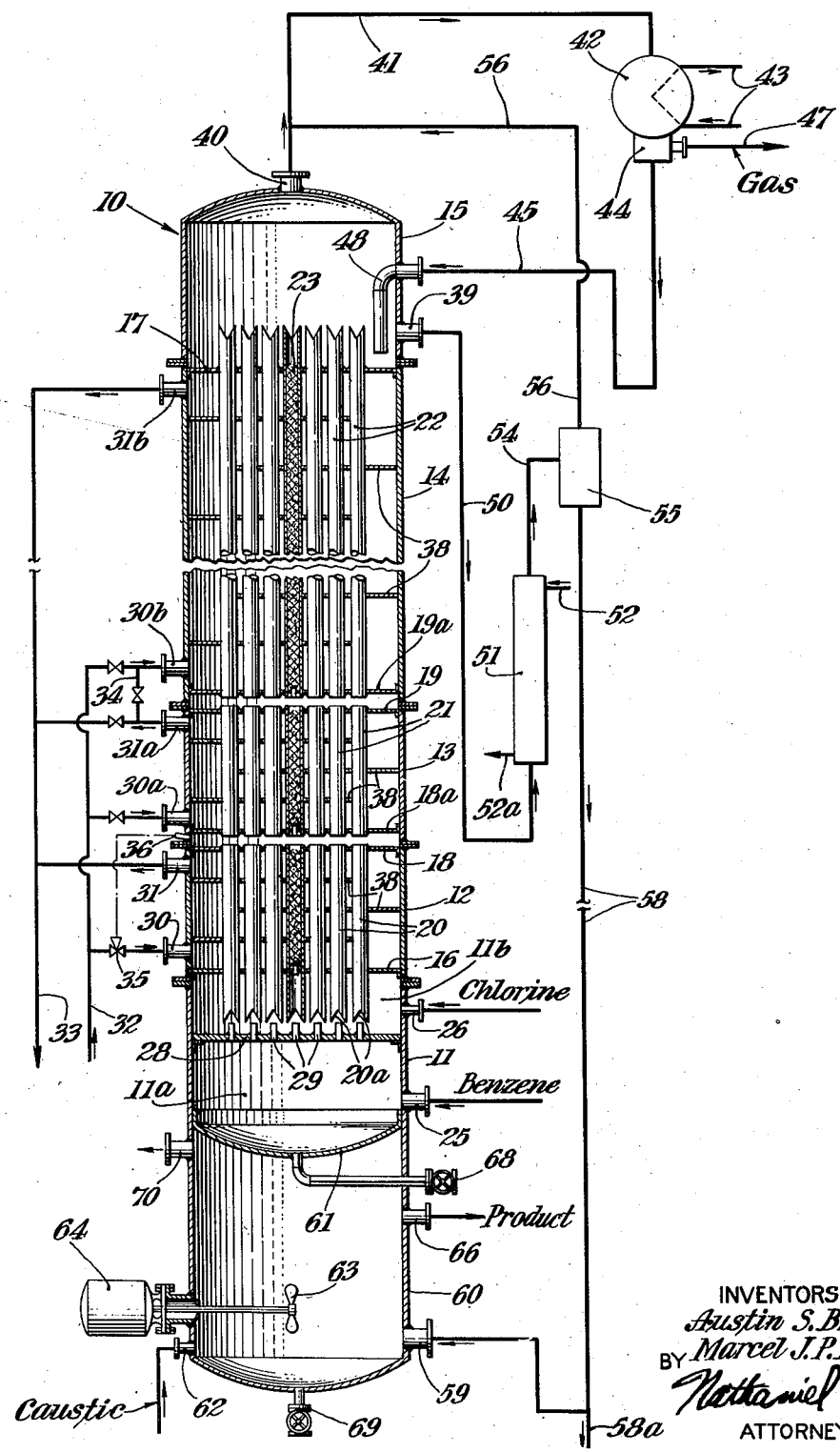
INVENTORS
Austin S. Brunjes &
BY Marcel J. P. Bogart
Nathaniel Ely
ATTORNEY Patented Feb. 26, 1946

2,395,777

UNITED STATES PATENT OFFICE 2,395,777

HALOGENATION OF AROMATIC HYDROCARBONS

Austin S. Brunjes, Plandome, N. Y., and Marcel J. P. Bogart, Teaneck, N. J., assignors to The Lummus Company, New York, N. Y., a corporation of Delaware Application June 22, 1942, Serial No. 447,983

2 Claims. (Cl. 23—285)

This invention relates to an improved method of and apparatus for carrying out the halogenation of an aromatic hydrocarbon and specifically relates to the chlorination of benzene.

As is well known, chlorinated benzenes are commonly used as a base material in the production of many chemicals. More particularly, phenol and other products are obtained by the suitable conversion of monochlorbenzene. The chlorination of benzene to produce substantial yields of monochlorbenzene can not be readily carried out, however, except by the most careful control of the conditions of the reaction, particularly the temperature, in order to prevent undue side reactions from taking place.

It is one of the principal objects of our invention to provide an improved form of apparatus for the chlorination of benzene specifically and for the carrying out of similar reactions in general, in which apparatus intimate mixing of the reactants and accurate temperature control of the reaction are accomplished.

A further object of our invention is to provide an improved process for specifically controlling the reaction between chlorine and benzene whereby the maximum yield of monochlorbenzene and the minimum yield of polychlorbenzenes are obtained, or alternatively, the production of a maximum yield of polychlorbenzenes.

A still further object of our invention is to provide an improved continuous process for halogenating aromatic hydrocarbons such as benzene to produce desired halogenated hydrocarbons such as chlorbenzene useful in the production of industrial materials, which process is particularly adapted for large-scale, economical operation and simplified control.

Further objects and advantages of our invention will appear from the following description of a preferred form of embodiment thereof taken in connection with the attached drawing, in which the figure is a vertical section through our improved reaction chamber, with which the related apparatus is shown in schematic flow diagram.

As a specific form of embodiment of our invention, we prefer to build the reaction vessel 10 in a series of sections. The lowest section 11 is a feed chamber and may have a neutralizing chamber. This section also acts as the foundation for the entire vessel. It is surmounted by several shell and tube heat exchange and reaction sections, of which three, 12, 13 and 14, are shown. The uppermost section 15 may be termed the vapor chamber section.

With a reaction such as halogenation of aromatic hydrocarbons, it is highly desirable to provide optimum temperature control at the zone of reaction, and we also find it desirable to provide for individual unit replacement of apparatus. For these reasons the sections 12, 13 and 14 are independent, having tube sheets 16 and 18, 18a and 19, and 19a and 17, respectively, to which the reaction tubes 20, 21 and 22 are secured. These tubes are in alignment and provide for the desired flow of reactants as hereinafter described. Each tube is filled with a suitable packing 23, which may consist of any suitable material such as ceramic or iron rings. We prefer to use Raschig rings or the like, and these may be treated with ferric chloride if desired.

A controlled inlet of the reactants (benzene and chlorine) to these tubes can be accomplished most successfully according to our invention by injecting the benzene through a chamber of chlorine. This may be accomplished by introducing the chlorine as a gas into chamber 11b through inlets 26 and forcing the benzene as a liquid into chamber 11a through inlet 25 and thence through distributor plate 28.

This plate 28 contains a plurality of nozzles 29 in alignment with the lower ends of the reaction tubes 20, which are desirably V-notched as at 20a. This assures the introduction of the mixture of benzene and chlorine into these tubes through the jet action of the nozzles 29. It is to be noted that the chlorine inlets 26 are positioned above the lower end of the tubes 20 so that the chlorine is drawn into the reaction tubes by means of the jet action.

The reaction sections 12, 13 and 14 are preferably so arranged within the reaction vessel 10 that a suitable cooling medium can be independently circulated about them in indirect heat exchange therewith. This is most important when the reaction is exothermic and it is necessary to regulate the temperature of the reaction to prevent side reactions from taking place. This is the case in the formation of chlorbenzenes, the formation of monochlorbenzene being best accomplished at temperatures of 40 to 45° C. whereas formation of polychlorbenzenes is best accomplished at around 75 to 85° C. For this reason, it is necessary to precisely control the cooling effect in the respective sections.

We have found that water is a satisfactory cooling medium. Cooling water inlet nozzles 30, 30a, and 30b, respectively, may be interconnected with inlet manifold 32 and cooling water discharge nozzles 31, 31a, and 31b, respectively, may be interconnected to the discharge manifold 33. If desired, the cooling water may pass through the upper two sections 13 and 14 in series and cross-connection 34 may be used for this purpose. Suitable valves will be provided for regulating the flow of cooling water.

It will generally be necessary to remove the largest amount of heat in the lowermost heat exchange-reaction section 12, and a close temperature control in this section is necessary. For this purpose valve 35 can be interconnected with a suitable temperature controller generally indicated at 36 so that the flow of cooling water through inlet nozzle 30 may be automatically controlled by the exit temperature of reaction section 12. It is to be noted that the several heat exchange-reaction sections are desirably provided with baffles 38 for the suitable distribution of the cooling water about the reaction tubes.

Benzene and chlorine reactants as previously indicated pass upwardly through the reaction tubes and come into contact with the packing therein. This packing provides for a substantially complete mixing of these reactants and also insures that the reactants come into intimate contact with each other. The reaction takes place for the most part in the lower portion of the reacting tubes, although the reacting tubes are sufficiently long so that the reaction is substantially complete by the time the reactants have traversed the length of these tubes. The ends of these tubes are also V-notched at the top, which facilitates the separation of the gases from the liquid products at the upper part of the reaction zone.

Apparatus may be used for counterflow chlorination by introducing benzene at top and chlorine at bottom when it is desirable to do so.

The mixture of reaction products discharged from the reaction tubes is partially in the liquid and partially in the vapor state. This reaction mixture consists of chlorbenzenes, unreacted benzene, and hydrogen chloride. The liquid portion of the reaction mixture is removed through nozzle 39. The vapor portion of the reaction mixture is removed from reaction vessel 10 through nozzle 40 and is passed through line 41 to condenser 42 wherein the vaporized benzene and chlorbenzene are condensed. A suitable cooling medium may be circulated through condenser 42 by means of lines 43. The condensed material is separated from the uncondensed hydrogen chloride in separator 44, from which the condensate is returned through line 45 to the vapor chamber section 15. The uncondensed hydrogen chloride will be removed in its gaseous state through line 47 to a suitable recovery system or the like. It is to be noted that the condensate is reintroduced into section 15 through nozzle 48, which is so designed that its discharge is below the upper end of the reacting tubes 22. Thus nozzle 48 discharges the condensate below the level of liquid in section 15, which aids in the recovery of the liquid product.

The liquid portion of the reaction mixture removed through nozzle 39 is passed through line 50 into heater 51 wherein a portion of this liquid is heated to the boiling point to remove as much hydrogen chloride as possible. A suitable heating material such as steam may be circulated through heater 51 as by means of lines 52 and 52a for this purpose. The partially vaporized liquid is passed through line 54 into the flash chamber 55 wherein the vaporized portion of the liquid is separated from the unvaporized portion. This vaporized portion comprises the hydrogen chloride dissolved in the liquid together with some benzene and chlorbenzene vapors. The vapors are passed through line 56 for admixture with the vapors in line 41. Any liquid contained therein will drop back to the chamber 15 with the vapor portion continuing to the condensed 42.

The liquid in flash chamber 55 is removed therefrom through line 58 and may be withdrawn as product at 58a or be introduced through nozzle 59 into the neutralizing chamber 60 formed by the dished head 61 and the bottom of the section 11. This liquid comprises benzene and chlorbenzene containing a very small percentage of dissolved hydrogen chloride and, if a neutral product is desired, it may be neutralized by adding a neutralizing agent such as caustic soda. This is suitably introduced into the neutralizing chamber through nozzle 62. An agitator 63 driven by motor 64 is provided to effect a mixing of caustic with the benzene and chlorbenzene. The neutralized product is discharged from chamber 60 through nozzle 66 and may be passed to a suitable settler (not shown) in which the sludge of caustic and sodium chloride is settled out and separated from the benzene and chlorbenzene.

We have found it preferable to fabricate reaction vessel 10 as an integrated unit as shown. In this manner not only is a compact vessel provided, but the amount of space necessary for the equipment is materially reduced. As indicated, the bottom of the feed chamber section 11 may be provided with a suitable drain 68. The neutralizing chamber may also be provided with a suitable drain 69 as well as a vent 70 for the removal of any uncondensable material. Ordinarily we find it desirable to operate the reaction section under a slight superatmospheric pressure.

The apparatus is particularly adapted for the maximum production of monochlorbenzene and in such case appropriate temperatures are obtained by the use of controlled flow of the cooling liquid. However, if it is desired to produce a maximum yield of polychlorbenzenes, higher temperatures are desirable, and it may be found desirable to introduce steam in the heat exchange sections rather than water.

The apparatus is also adapted to further chlorinate partially chlorinated aromatic hydrocarbons or other organic liquids by changing the type of feed. It may also be found desirable to introduce additional amounts of either chlorine or benzene or both at intermediate points along the length of the reaction tubes by introducing either or both materials into the compartments between the respective tube sheets 18 and 18a and 19 and 19a. Such operation may be found desirable to better control the reaction.

Although we have shown and described a preferred form of embodiment of our invention, it will be understood that modifications may be made thereto; therefore, only such limitations as appear in the claims appended hereinafter should be made.

We claim:

1. Apparatus for conducting a reaction between a liquid and a gas, comprising an elongated vertically extending shell, vertically spaced transverse partitions dividing said shell into a plurality of superposed chambers, the lowermost one of said chambers forming a first feed chamber for a liquid reactant, the chamber immediately above it forming a second feed chamber for a gaseous reactant, and the remaining chambers comprising a series of alternate relatively deep and shallow chambers, and a discharge chamber above said series, vertically extending transversely spaced tubes within each of said deep chambers and fixed in the partitions forming the upper and lower sides of the chamber, the tubes of adjacent deep sections opening into the shallow chambers therebetween, the tubes of the uppermost deep chamber opening into the said discharge chamber, and the tubes of the lowermost deep chamber opening into the upper one of said feed chambers to receive the gaseous reactant, and nozzles in vertical alignment with the tubes opening into said gas feed chamber and extending upwardly from the lower feed chamber to discharge the liquid reactant therefrom and into said tubes, each deep chamber having an inlet and an outlet for a heat exchange fluid.

2. Apparatus for conducting a reaction, comprising an elongated vertically extending shell, vertically spaced transverse partitions dividing said shell into a plurality of superposed chambers, the lowermost one of said chambers forming a first feed chamber for a fluid reactant, the chamber immediately above it forming a second feed chamber for another fluid reactant, and the remaining chambers comprising a series of alternate relatively deep and shallow chambers, and a discharge chamber above said series, vertically extending transversely spaced tubes within each of said deep chambers and fixed in the partitions forming the upper and lower sides of the chamber, the tubes of adjacent deep sections opening into the shallow chambers therebetween, the tubes of the uppermost deep chamber opening into the said discharge chamber, and the tubes of the lowermost deep chamber opening into the upper one of said feed chambers to receive the reactant therefrom, nozzles in vertical alignment with the tubes opening into said upper feed chamber and extending upwardly from the lower feed chamber to discharge the other reactant therefrom and into said tubes, each deep chamber having an inlet and an outlet for a heat exchange fluid, and means responsive to variations in temperature within the lowermost one of said shallow chambers to control circulation of the heat exchange fluid through the lowermost one of said deep chambers.

AUSTIN S. BRUNJES.
MARCEL J. P. BOGART.